US010405308B2

(12) United States Patent
Bendlin et al.

(10) Patent No.: US 10,405,308 B2
(45) Date of Patent: Sep. 3, 2019

(54) FACILITATING FORWARD-COMPATIBLE RECEIVERS IN WIRELESS COMMUNICATIONS SYSTEMS

(71) Applicant: AT&T Intellectual Property I, L.P., Atlanta, GA (US)

(72) Inventors: Ralf Bendlin, Cedar Park, TX (US); Xiaoyi Wang, Austin, TX (US); Salam Akoum, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 15/675,342

(22) Filed: Aug. 11, 2017

(65) Prior Publication Data

US 2019/0053202 A1 Feb. 14, 2019

(51) Int. Cl.
*H04W 72/04* (2009.01)
*H04W 28/02* (2009.01)
(Continued)

(52) U.S. Cl.
CPC ......... *H04W 72/042* (2013.01); *H04L 5/0044* (2013.01); *H04W 28/0215* (2013.01);
(Continued)

(58) Field of Classification Search
CPC ..... H04W 72/04; H04W 28/02; H04W 28/26; H04W 28/08; H04W 48/12; H04W 48/16;
(Continued)

(56) References Cited

U.S. PATENT DOCUMENTS 8,000,233 B2 8/2011 Anderson et al.
8,532,050 B2 9/2013 Awad
(Continued)

FOREIGN PATENT DOCUMENTS

WO 2007094628 A1 8/2007
WO 2013166804 A1 11/2013
(Continued)

OTHER PUBLICATIONS

"Forward Compatibility Aspects of NR Control Channel," 3GPP TSG RA WG1 Meeting #87, R1-1612629, Nov. 14-18, 2016, Cohere Technologies, 4 pages. http://www.3gpp.org/ftp/tsg_ran/WG1_RL1/TSGR1_87/Docs/R1-1612629.zip.
(Continued)

*Primary Examiner* — Meless N Zewdu
(74) *Attorney, Agent, or Firm* — Amin, Turocy & Watson, LLP

(57) ABSTRACT

A system facilitating forward-compatible receivers in wireless communications systems. In one example, the system can include: a processor; and a memory that stores executable instructions that, when executed by the processor, facilitate performance of operations, comprising: generating information according to a protocol for receipt by a mobile device, wherein the information is indicative of a defined behavior of the mobile device relative to whether the mobile device is to override a reserved resource allocation applicable to a physical resource, and wherein the reserved resource allocation is indicative of whether the mobile device is authorized to communicate via the physical resource; and transmitting the information to the mobile device.

20 Claims, 11 Drawing Sheets

(51) Int. Cl.
  *H04W 48/12*  (2009.01)
  *H04W 76/04*  (2009.01)
  *H04W 76/27*  (2018.01)
  *H04W 48/16*  (2009.01)
  *H04L 5/00*   (2006.01)

(52) U.S. Cl.
  CPC ........... *H04W 48/12* (2013.01); *H04W 48/16* (2013.01); *H04W 76/27* (2018.02); *H04L 5/0005* (2013.01); *H04L 5/005* (2013.01); *H04L 5/0053* (2013.01); *H04L 5/0073* (2013.01); *H04L 5/0096* (2013.01)

(58) Field of Classification Search
  CPC . H04W 76/04; H04W 28/0273; H04W 28/10; H04W 72/1257; H04W 72/1289; H04W 72/00; H04W 80/00; H04W 80/06; H04W 80/08; H04W 80/10; H04W 76/27; H04W 76/00; H04W 28/0215; H04W 72/042; H04W 24/10; H04W 72/1278; H04W 72/12; H04W 72/002; H04W 74/006; H04W 72/0493; H04W 72/14; H04W 88/02; H04W 88/08; H04W 88/00; H04W 76/25; H04W 76/10; H04L 5/0073; H04L 5/0044; H04L 5/005; H04L 5/0053; H04L 5/0096; H04L 5/0005
  See application file for complete search history.

(56) References Cited

U.S. PATENT DOCUMENTS

| | | | |
|---|---|---|---|
| 8,611,261 B2 | 12/2013 | Che et al. | |
| 9,392,588 B2 | 7/2016 | Zhang et al. | |
| 9,497,004 B2 | 11/2016 | Astely et al. | |
| 9,541,632 B2 | 1/2017 | Frank et al. | |
| 10,091,777 B1* | 10/2018 | Wang et al. | H04W 72/042 |
| 2010/0002638 A1* | 1/2010 | Parl et al. | 370/329 |
| 2010/0019899 A1* | 1/2010 | Zhang et al. | 340/540 |
| 2013/0170461 A1* | 7/2013 | Ren | H04L 1/1893 370/329 |
| 2013/0279461 A1* | 10/2013 | De Bruin | H04W 72/0426 370/329 |
| 2014/0029545 A1* | 1/2014 | Kim | H04L 1/1671 370/329 |
| 2014/0177487 A1* | 6/2014 | Hammarwall et al. | H04W 72/042 |
| 2015/0036667 A1* | 2/2015 | El-Saidny et al. | H04W 72/02 |
| 2015/0181570 A1 | 6/2015 | Sorrentino et al. | |
| 2015/0333896 A1* | 11/2015 | Damnjanovic | H04W 72/048 370/277 |
| 2015/0358111 A1* | 12/2015 | Marinier | H04L 1/0003 370/329 |
| 2016/0302175 A1 | 10/2016 | Blankenship et al. | |
| 2016/0338032 A1 | 11/2016 | Wang et al. | |
| 2016/0345303 A1* | 11/2016 | Nazar et al. | H04W 72/042 |
| 2016/0381544 A1 | 12/2016 | Wang | |
| 2017/0071019 A1 | 3/2017 | Wakabayashi et al. | |
| 2017/0118743 A1 | 4/2017 | Kim et al. | |
| 2017/0164350 A1 | 6/2017 | Sun et al. | |
| 2017/0202006 A1 | 7/2017 | Rao et al. | |
| 2018/0063765 A1* | 3/2018 | Bansal | H04W 24/02 |

FOREIGN PATENT DOCUMENTS

| | | |
|---|---|---|
| WO | 2017078827 A1 | 5/2017 |
| WO | 2017119931 A1 | 7/2017 |
| WO | 2017121619 A1 | 7/2017 |
| WO | 2017123129 A1 | 7/2017 |
| WO | 2017123279 A1 | 7/2017 |
| WO | 2017137861 A1 | 8/2017 |

OTHER PUBLICATIONS

"Signaling design for reserved resource indication," 3GPP TSG RAN WG1 Meeting #87, R1-1611206, Nov. 14-18, 2016, Huawei, HiSilicon, 3 pages. http://www.3gpp.org/ftp/tsg_ran/WG1_RL1/TSGR1_87/Docs/R1-1611206.zip.
"Indication of Reserved Resources," 3GPP TSG RAN WG1 #87, R1-1612440, Nov. 14-18, 2016, Samsung, 3 pages. http://www.3gpp.org/ftp/tsg_ran/WG1_RL1/TSGR1_87/Docs/R1-1612440.zip.
"Remaining details of signaling support for reserved resources," 3GPP TSG RAN WG1 Meeting #87, R1-1612001, Nov. 14-18, 2016, Intel Corporation, 4 pages. http://www.3gpp.org/ftp/tsg_ran/WG1_RL1/TSGR1_87/Docs/R1-1612001.zip.
International Search Report and Written Opinion for International Application No. PCT/US2018/045509 dated Nov. 23, 2018, 16 pages.
Samsung, "LTE-NR coexistence for DL," 3GPP TSG RAN WG1 NR Ad-Hoc#2, Jun. 2017, R1-1710762, Qingdao, China, 3 pages.
Samsung, "Functionalities of UE-Common PDCCH," 3GPP TSG RAN WG1 NR ad-Hoc#2, Jun. 2017, R1-1710698, Qingdao, China, 5 pages.

* cited by examiner

FACILITATING FORWARD-COMPATIBLE RECEIVERS IN WIRELESS COMMUNICATIONS SYSTEMS

TECHNICAL FIELD

The subject disclosure relates generally to communications systems, and, for example, to systems, methods and/or machine-readable storage media for facilitating forward-compatible mobile device receivers in wireless communication systems.

BACKGROUND

To meet the huge demand for data centric applications, Third Generation Partnership Project (3GPP) systems and systems that employ one or more aspects of the specifications of the Fourth Generation (4G) standard for wireless communications will be extended to a Fifth Generation (5G) standard for wireless communications. Unique challenges exist to provide levels of service associated with forthcoming 5G standards.

DETAILED DESCRIPTION

Figure 1:
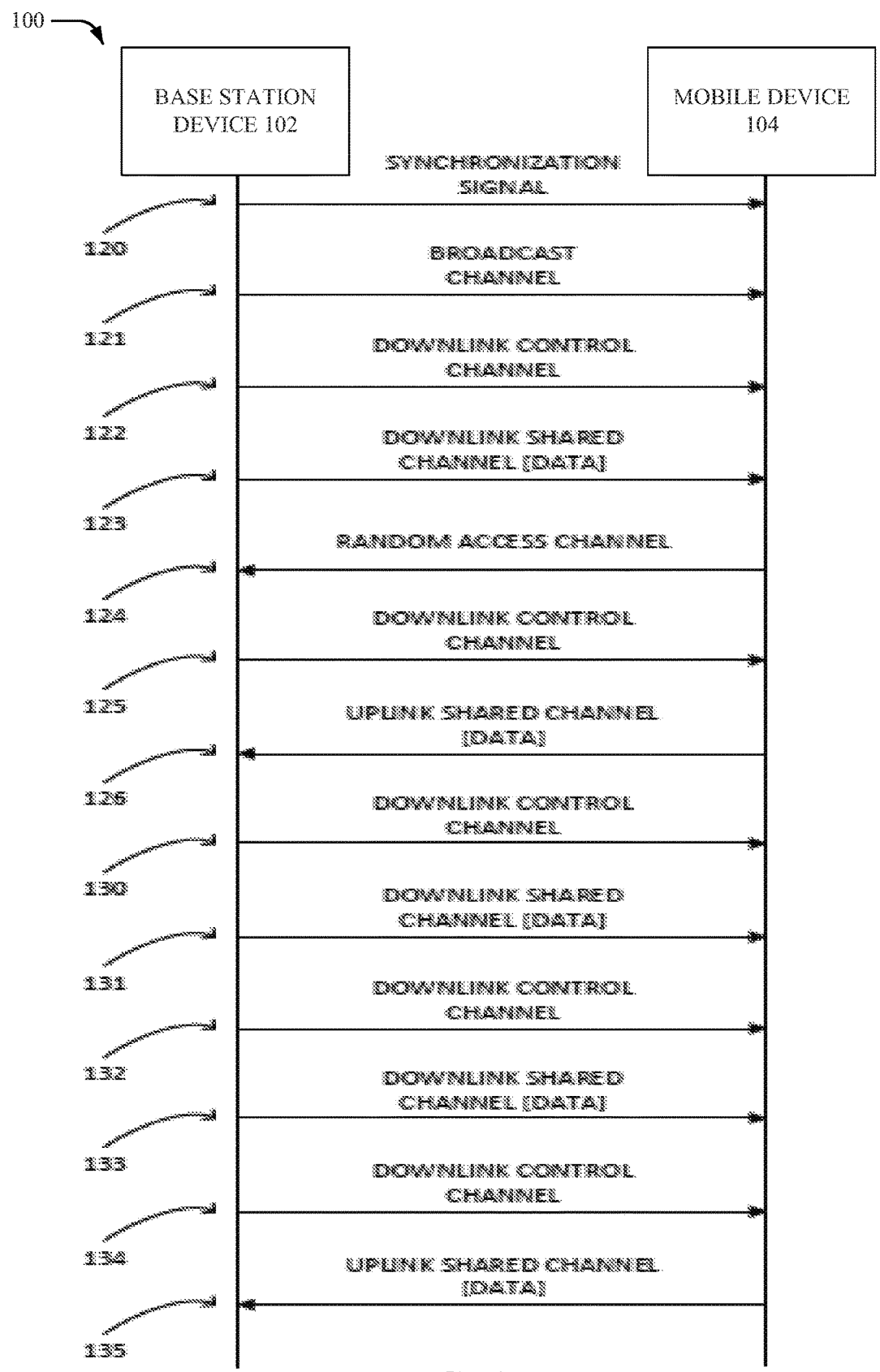
FIG. 1 illustrates an example, non-limiting message sequence flow chart to facilitate forward-compatible mobile device receivers in wireless communication systems in accordance with one or more embodiments described herein.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "user equipment (UE)," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "next generation Node B (gNB)," "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, third generation partnership project (3GPP) new radio (NR), wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

Legacy wireless systems such as LTE, Long-Term Evolution Advanced (LTE-A and LTE-A-Pro), High Speed Packet Access (HSPA) etc. can have downlink control channels that carry information about the scheduling grants and assignments. Typically this includes a number of multiple input multiple output (MIMO) layers scheduled, transport block sizes, modulation for each codeword, parameters related to hybrid automatic repeat request (HARD), subband locations and also precoding matrix index corresponding to the sub bands.

Typically, the following information can be transmitted based on the downlink control information (DCI) format: Localized/Distributed virtual resource block (VRB) assignment flag, resource block assignment, modulation and coding scheme, HARQ process number, new data indicator, redundancy version, transmit power control (TPC) command for uplink control channel, downlink assignment index, precoding matrix index and/or number of layers.

As used herein, "5G" and New Radio (NR) are used interchangeably. Accordingly, systems, methods and/or machine-readable storage media for facilitating efficient usage of physical resource, viz., spectrum, in a 5G wireless communication system is desired. As used herein, one or more aspects of a 5G network can comprise, but is not limited to, data rates of several tens of megabits per second (Mbps) supported for tens of thousands of users; at least one gigabit per second (Gbps) to be offered simultaneously to tens of users (e.g., tens of workers on the same office floor); several hundreds of thousands of simultaneous connections supported for massive sensor deployments; spectral efficiency significantly enhanced compared to 4G; improvement in coverage relative to 4G; signaling efficiency enhanced compared to 4G; and/or latency significantly reduced compared to LTE.

Current wireless cellular communications systems such as the Third Generation Partnership Project's (3GPP) Long-Term Evolution (LTE) of the Universal Mobile Telecommunications Service (UMTS) do not allow for the configuration of reserved resources in the frequency domain. LTE does, however, allow the configuration of reserved resources in the time domain. More precisely, all LTE mobile devices can be configured with multicast-broadcast single-frequency network (MBSFN) subframes that are reserved for Multimedia Broadcast/Multicast Services (MBMS). In a normal downlink (DL) subframe, the Physical Downlink Control Channel (PDCCH) is transmitted in the control region of the subframe whose span in time domain is indicated by the Physical Control Format Indicator Channel (PCFICH) transmitted on the first symbol of every DL subframe. After decoding the PCFICH, the mobile device is aware of the control region span of the subframe in which the PCFICH was transmitted and thus can monitor in said control region for PDCCH transmissions. A PDCCH transmission may schedule a DL or uplink (UL) data transmission in the same or a later subframe. In case of a DL assignment, the PDCCH schedules a Physical Downlink Shared Channel (PDSCH) in the same subframe whereas in case of an uplink (UL) grant, it schedules a Physical Uplink Shared Channel (PUSCH) in a later subframe. MBSFN subframes, like the aforementioned normal downlink (DL) subframes, also have a control region at the beginning of the subframe, however, in addition to dynamically indicating the Control Format Indicator (CFI) in the PCFICH, the span of the control region in an MBSFN subframe can also be configured via the Radio Resource Control (RRC) protocol. For example, for one or two cell-specific reference signal (CRS) antenna ports, the control region in an MBSFN subframe can span one or two Orthogonal Frequency-Division Multiplexing (OFDM) symbols whereas for four CRS antenna ports, the span of the control region of an MBSFN subframe is always two. The control region of an MBSFN subframe is also called the non-MBSFN region of the MBSFN subframe whereas the remainder of the subframe is referred to as the MBSFN region. The MBSFN region can be used to transmit the Physical Multicast Channel (PMCH) which is scheduled by the logical MBMS Control Channel (MCCH). Alternatively, just like in the case of normal DL subframes, a PDCCH in the non-MBSFN region can schedule a PDSCH in the MBSFN region of the same subframe. MBSFN subframes thus allow to reserve resources for the transmission of MBMS services transmitted on the PMCH.

Both the non-multicast-broadcast single-frequency network (MBSFN) region and MBSFN region typically span the entire system bandwidth. In other words, resources within the system bandwidth can be partitioned in time domain into MBSFN and non-MBSFN resources, but not in frequency domain. This is a severe shortcoming of the 3GPP LTE standard. For example, in LTE Release 13 a narrowband Internet-of-Things (NB-IoT) service was introduced that operates on a single Physical Resource Block (PRB) within the system bandwidth of an LTE carrier. Hence, in order to operate NB-IoT within an LTE donor cell, the mobile network operator (MNO) must partition the physical resources into PRBs used for LTE physical downlink control channel (PDCCH)/physical downlink shared channel (PDSCH)/Cell-specific Reference Signal (CRS) transmissions and NB-IoT transmissions.

In order to preserve the low-cost and superior coverage of NB-IoT a limit narrow bandwidth, e.g., 180 kilohertz (kHz), is crucial. Hence, unlike Multimedia Broadcast Multicast Services (MBMS), LTE and NB-IoT cannot be time-division multiplexed whereby each spans the entire system bandwidth at any given time. Rather, they have to be frequency-division multiplexed, i.e., some PRBs at any given time are occupied by LTE transmissions whereas others are by NB-IoT transmissions. Since LTE does now allow for reserved resources in the frequency domain, the NB-IoT design is cumbersome and inefficient. For example, NB-IoT transmissions in any given subframe must be rate matched around LTE PDCCH and CRS transmissions which are always transmitted in a wideband manner even in MBSFN subframes.

3GPP already agreed that in its next-generation wireless cellular communications standard called New Radio (NR) it will allow for semi-statically and/or dynamically reserved resources in both time and frequency domain to overcome the aforementioned shortcomings of LTE.

One or more embodiments described herein can enable resources to be configurable on a PRB or Resource Block Group (RBG) level or a bandwidth part (BWP) level in frequency domain and an OFDM symbol, slot or mini-slot level in time domain. Regardless of the granularity, RAN1 has not discussed and decided on the mobile device behavior regarding the reserved resources. Thus, one or more embodiments described herein can provide additional signaling to control the mobile device behavior with regard to configured reserved resources in time and/or frequency domain to allow adaptive control of the rate matching and/or puncturing behavior of the transmitter and receiver around reserved resources within a slot or subframe. More precisely, the novel signaling can instruct the mobile device receiver how to process signals and channels that overlap with reserved resources.

One or more embodiments described herein can include systems, apparatus, methods and/or machine-readable storage media that can facilitate forward-compatible receivers in wireless communications systems. In one embodiment, an apparatus is provided. The apparatus can comprise: a processor; and a memory that stores executable instructions that, when executed by the processor, facilitate performance of operations. The operations can comprise: generating information according to a protocol for receipt by a mobile device, wherein the information is indicative of a defined behavior of the mobile device relative to whether the mobile device is to override a reserved resource allocation applicable to a physical resource, and wherein the reserved resource allocation is indicative of whether the mobile device is authorized to communicate via the physical resource; and transmitting the information to the mobile device.

In another embodiment, a method is provided. The method can comprise: generating, by a device comprising a processor, information according to a protocol for receipt by a mobile device, wherein the information is indicative of a defined behavior of the mobile device relative to whether the mobile device is to override a reserved resource allocation applicable to a physical resource, and wherein the reserved resource allocation is indicative of whether the mobile device is authorized to communicate via the physical resource; and transmitting, by the device, the information to the mobile device.

In another embodiment, a machine-readable storage medium, comprising executable instructions that, when executed by a processor, facilitate performance of operations is provided. The operations can comprise: receiving information according to a protocol from a base station device, wherein the information is indicative of a defined behavior of a mobile device relative to whether the mobile device is to override a reserved resource allocation applicable to a physical resource, and wherein the reserved resource allocation is indicative of whether the mobile device is authorized to communicate via the physical resource; and communicating information content in a time associated with the reserved resource allocation thereby overriding the reserved resource allocation based on the information.

One or more embodiments can allow the base station device transmitter of a wireless communications system to control the behavior of a mobile device with respect to time/frequency resources that are reserved from the mobile device's perspective. This can allow flexible re-use of such resources thereby increasing network performance, user experience, and system efficiency.

One or more embodiments can allow for true forward compatibility by rendering the mobile device receiver behavior adaptive in a controllable and deterministic manner. One or more of the novel signaling embodiments described herein can also allow for improved performance when robustness or accuracy outweighs the need for reserved resources, e.g., when positioning signals are configured for determining a mobile device's location in an emergency. Different signaling embodiments are presented with varying degrees of overhead and flexibility to offer trade-offs among the two. The novel embodiments of signaling methods can be implicit or explicit, semi-static or dynamic, or list based.

Figure 2:
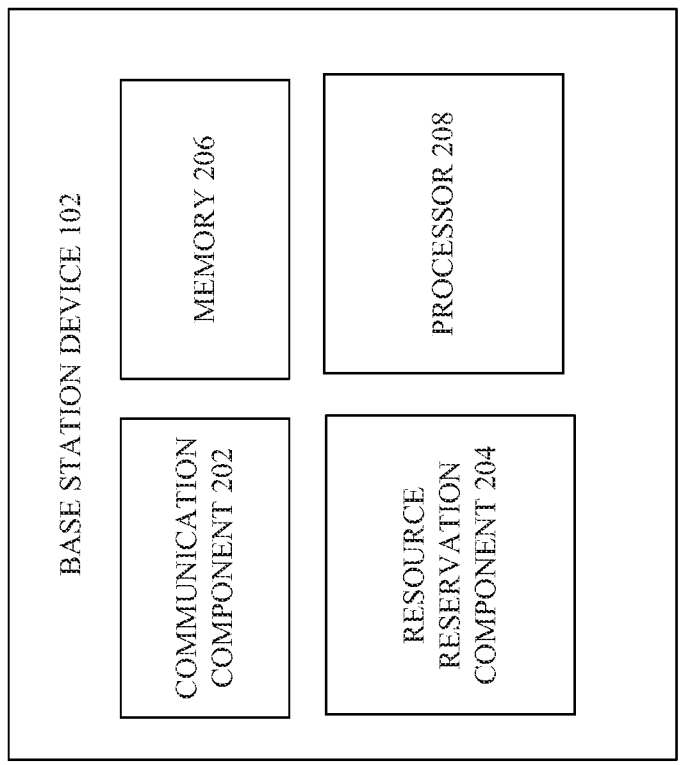
FIG. 2 illustrates an example, non-limiting block diagram of a base station device that can facilitate forward-compatible mobile device receivers in wireless communication systems in accordance with one or more embodiments described herein.
Figure 3:
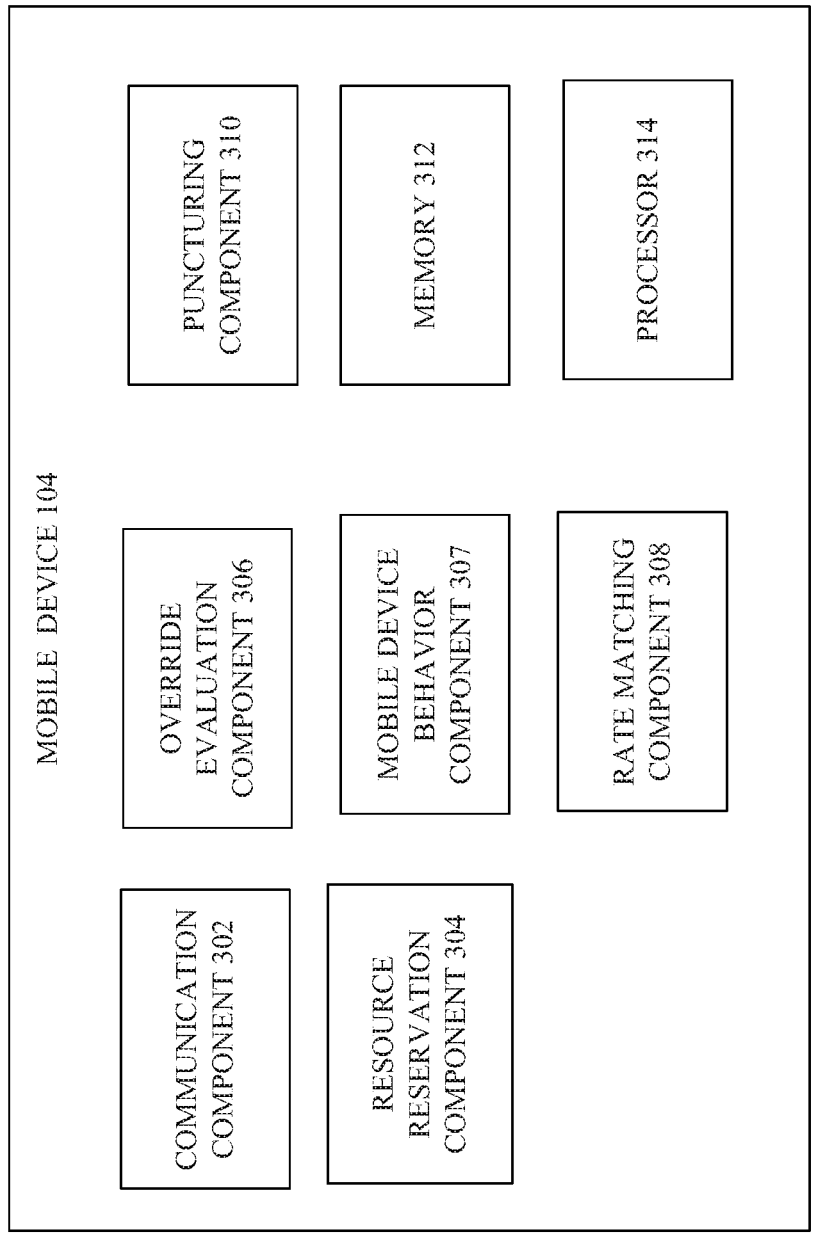
FIG. 3 illustrates an example, non-limiting block diagram of a mobile device for which a forward-compatible mobile device receiver in a wireless communication system can be facilitated in accordance with one or more embodiments described herein.

FIG. 1 illustrates an example, non-limiting message sequence flow chart to facilitate forward-compatible mobile device receivers in wireless communication systems in accordance with one or more embodiments described herein. FIG. 2 illustrates an example, non-limiting block diagram of a base station device that can facilitate forward-compatible mobile device receivers in wireless communication systems in accordance with one or more embodiments described herein. FIG. 3 illustrates an example, non-limiting block diagram of a mobile device for which a forward-compatible mobile device receiver in a wireless communication system can be facilitated in accordance with one or more embodiments described herein. Repetitive description of like elements employed in other embodiments described herein is omitted for sake of brevity.

The system 100 described herein can provide for forward-compatible mobile device (e.g., mobile device 104) receivers in the network. Turning to FIG. 1, one or more embodiments can enable the BS device 102 to dynamically control and/or change mobile device 104 behavior dynamically and/or semi-statically. In some embodiments, the system 100 can override resource allocations to enable a mobile device 104 to transmit and/or receive information during a time associated with a reserved resource that would typically be reserved for receipt and/or transmission of signaling (not data). As used herein, dynamical control can mean control of mobile device behavior that can change from time to time.

As used herein, semi-static control can mean control of mobile device behavior that can be based, at least in part, on configuration of the mobile device prior to or during base station device 102 operation.

At 120, the base station device 102 sends a synchronization signal for the mobile device 104 to detect cell, and perform time/frequency synchronization. At 121, the base station device 102 sends a broadcast channel for a mobile device 104 to decode master information block. At 122, the downlink control channel is sent by the base station device 102 and schedules the downlink shared channel (data) shown at 123. At 123, the downlink shared channel (data) is sent by the base station device 102 for the mobile device 104 to obtain random access channel (RACH) (step 124) configuration. The RACH is sent by the mobile device 104 to allow the base station device 104 to detect the mobile device 104. 125 is sent by the base station device 102 termed random access response (RAR). At 126, the uplink shared channel (data) is sent by the mobile device 104, confirms RAR in 125, and allows mobile device 104 to signal capabilities.

Steps 130, 131, 132, 133, 134, 135 pertains to one or more embodiments described herein. At 130, the downlink control channel schedules the downlink shared channel (data), which is sent in step 131. In step 131, the mobile device 104 may be configured according to some embodiments herein. In step 132, a mobile device 104 behavior may be indicated according to some embodiments herein for a downlink transmission in step 133. In step 134, a mobile device 104 behavior may be indicated according to some embodiments herein for a uplink transmission in step 135.

As used herein, the term "BS device 102" can be interchangeable with (or include) a network, a network controller or any number of other network components.

As such, one or more embodiments can enable the BS device 102 to dynamically signal (or, in some embodiments, semi-statically signal) the mobile device 104 to have particular behavior relative to transmission and/or reception during reserved resource allocations.

Additional detail regarding the specific embodiments regarding how mobile device 104 behavior can be controlled will be discussed with reference to FIGS. 1-10. As shown in FIG. 2, the base station device 102 can comprise communication component 202, resource reservation component 204, memory 206 and/or processor 208. In some embodiments, one or more of communication component 202, resource reservation component 204, memory 206 and/or processor 208 can be electrically and/or communicatively coupled to one another to perform one or more functions of base station device 102. As shown in FIG. 3, mobile device 104 can comprise communication component 302, resource reservation component 304, override evaluation component 306, mobile device behavior component 307, rate matching component 308, puncturing component 310, memory 312 and/or processor 314. In various embodiments, one or more of communication component 302, resource reservation component 304, override evaluation component 306, mobile device behavior component 307, rate matching component 308, puncturing component 310, memory 312 and/or processor 314 can be electrically and/or communicatively coupled to one another to perform one or more functions of base station device 102.

Referring to FIGS. 1, 2 and 3, the communication component 202 can transmit and/or receive control and/or data information to and/or from one or more mobile devices (e.g., mobile device 104) (e.g., to and/or from communication component 302 of the mobile device). In some embodiments, the communication component 202 can transmit information generated by the base station device 102 resource reservation component 204. The resource reservation component 204 of the base station device 102 can generate information according to a protocol for receipt by the mobile device 104, and the mobile device 104 resource reservation component 304 can determine and/or evaluate the information generated by the base station device 102 and sent to the mobile device 104.

The information can be indicative of a defined behavior of the mobile device 104 relative to whether the mobile device 104 is to override a reserved resource allocation (determined by the resource reservation component 204) and applicable to a physical resource. In some embodiments, the reserved resource allocation is indicative of whether the mobile device 104 is authorized to communicate via the physical resource. In some embodiments, the mobile device 104 override evaluation component 306 can evaluate whether to override and/or change a behavior of the mobile device 104 that may have been previously dictated by the base station device 102 via the generated information from the base station device. In some embodiments, the base station device 102 communication component 20 can transmit the information to the mobile device 104.

In some embodiments, to dictate mobile device 104 behavior, the base station device 102 can generate information indicative of a list of different priorities and in other embodiments, the base station device 102 can signal how the mobile device 104 is to treat the reserved resource. For example, the base station device 102 can indicate that, in normal operations, the mobile device 104 may operate according to the reserved resource allocation; however, the information generated by the base station device 102 can also indicate that in some cases (e.g., a case in which a mobile device 104 needs to make and/or receive an emergency call), the information indicating the reserved resource allocation takes lower priority and can be overrode by the mobile device 104 thereby allowing the mobile device 104 to have specific mobile device 104 behavior (e.g., transmitting and/or receiving during the reserved resource allocation that would typically not be designated for the mobile device 104 to transmit and/or receive). In this case, the base station device 102 can proceed with sending information for positioning reference signals to find the location of the mobile device 104 (and thus, the mobile device 104 may receive during a reserved resource allocation time that is not designated for mobile device 104 receipt of information). As such, in this case, the mobile device 104 can transmit and/or receive during this previously-reserved time period.

Alternatively, in some embodiments, the reserved resources can be configurable on a PRB or Resource Block Group (RBG) level or a bandwidth part (BWP) level in frequency domain and an OFDM symbol, slot or mini-slot level in time domain. One or more embodiments herein can provide additional signaling to control the UE behavior with regard to configured reserved resources in time and/or frequency domain to allow adaptive control of the rate matching (e.g., performed by rate matching component 308 of the mobile device 104) and/or puncturing behavior (e.g., performed by the puncturing component 310 of the mobile device 104) of the transmitter and receiver of the mobile device 104 around reserved resources within a slot, mini-slot, subframe or otherwise. As used herein, the term "rate matching" means the mobile device 104 determines which orthogonal frequency division multiplexed symbols and/or subcarriers are for transmission and/or reception of data and which are for signals. As used herein, "puncturing" means that modulated symbols for channels and signals are placed over all combinations of OFDM symbols and subcarriers according to a first set of configurations and then some of the portions associated with said modulated symbols are over-rode with other modulated symbols according to a second configuration, thus, some signals/channels are punctured with other information in some locations and the puncturing component 310 can determine the location of the data and the signal based on knowledge of the puncturing approach employed. One or more embodiments described herein can enable the base station device 102 to generate information that can instruct the receiver of the mobile device 104 regarding how to process signals and channels that overlap with reserved resources.

The manner of the base station device 102 informing the mobile device 104 regarding how the mobile device transmitter and the mobile device receiver should transmit and receive, respectively, can be considered mobile device 104 behavior (which can be carried out by the mobile device behavior component 307) and the information can be generated by the resource reservation component 204 of the base station device 102. Each embodiment of designated mobile device 104 behavior can be applicable to the downlink channel (reception at the mobile device 104) and/or the uplink channel (transmission from the mobile device 104).

Since each mobile device 104 knows whether it should transmit and/or receive at a certain time, generated information that dictates that the behavior of the mobile device 104 should change will be understood by the mobile device 104. For example, if a mobile device 104 knows it should typically turn a receiver off at a particular time, generated information from the base station device 102 indicating that the mobile device should change behavior will cause the mobile device to leave the receiver on or turn the receiver on for downlink reception, for example (and vice versa if the mobile device 104 would typically turn the transmitter on/off for transmission during a defined time-generated information from the base station device 102 indicating that the mobile device should change behavior will cause the mobile device to leave the transmitter on or turn the transmitter on for uplink transmission, for example).

In one embodiment of the invention, reserved resources are configured and associated with two sets of Control Resource Sets (CORESETs). If the base station device 102 transmitter sends the PDCCH scheduling a PDSCH message (e.g., downlink data from the base station device 102) in a first set of CORESETs, the mobile device 104 transceiver behavior is to not expect any transmissions in said reserved resources. Similarly, if the base station device 102 transmitter sends the PDCCH scheduling a PUSCH message (e.g., a message scheduling uplink transmission from the mobile device 104) in a first set of CORESETs, the mobile device 104 transceiver behavior is to not transmit anything in said reserved resources.

If, however, the base station device 102 transmitter sends the PDCCH scheduling a PDSCH in a second set of CORE-SETs, the mobile device 104 transceiver behavior is to expect at least some transmissions in said reserved resources (e.g., for example, the emergency call embodiment discussed above). The mobile device 104 will therefore override typical behavior of turning off the receiver during the reserved resource allocation time and turn the mobile device 104 receiver on so the base station device 102 can send location information, for example. As used herein and as understood for each embodiment described herein, disclosure herein of turning off the transmitter and/or receiver can also mean or include that the mobile device 104 does not transmit or receive (but the mobile device 104 transmitter or receiver is not turned off). Thus, in some cases, the transmitter or receiver is not turned off but still does not receive per the one or more embodiments described herein. All such embodiments are envisaged. Similarly, if the base station device 102 transmitter sends the PDCCH scheduling a PUSCH in a second set of CORESETs, the mobile device 104 transceiver behavior is to transmit at least some signals and/or channels in said reserved resources.

Accordingly, numerous different possibilities abound and are envisaged herein. The base station device 102 can send the same message over different resources (viz. CORESETs) or different messages over the same resources (viz. same CORESET). For example, a first message can be sent via a first resource and the first message can be sent via a second resource—the selected resource by the base station device 102 can communicate to the mobile device 104 the behavior for the mobile device 104.

As another example, a first message can be sent via first resources, and a second message can be sent via first resources. Or figuratively, delivering the same letter through two doors (the chosen door encodes the information regarding the mobile device 104 behavior implicitly) versus delivering two different letters through the same door (the information is different explicitly). The mobile device behavior component 307 generates one or more control signals to cause the transmitter and/or receiver to perform the behavior dictated in some embodiments.

In another embodiment of the invention, the BS can generate information in the form of Downlink Control Information (DCI) transmitted by a PDCCH that indicates whether the mobile device 104 transceiver should expect no or at least some transmissions in the reserved resources for the downlink direction (and, if so, turn on the receiver) and, for the uplink direction, whether the mobile device 104 transceiver should transmit no or at least some signals and/or channels in the reserved resources (and, if so, turn on the transmitter).

In one example, said PDCCH is mobile device-specific whereas in a different example, it can be mobile device group specific or cell-specific. Such an indication can be realized by a single bit in the DCI (by the DCI having a bit value of "0" or a bit value of "1"). For example, in the event of a group- or cell-specific PDCCH, the base station device 102 can instruct numerous mobile devices to turn their respective receivers on or off in one message.

Accordingly, in this embodiment, an explicit indicator of desired mobile device 104 behavior is provided in the information generated by the base station device 102 (in lieu of an implicit indicator). For example, an explicit payload bit value of the DCI is provided whereas in the previous embodiment, the use of one or two CORESETs was an implicit indicator of intended mobile device 104 behavior.

In yet another embodiment of the invention, the mobile device 104 behavior with regard to reserved resources is also indicated in the DCI, however, said indication, e.g., in the form of a single bit, is always accompanied by a DL assignment for a PDSCH or an UL grant for a PUSCH. In this embodiment, as compared to the previous embodiments that used the DCI, the DCI is accompanied by a data channel. for a specific mobile device (versus the previous embodiment is to dictate group mobile device behavior as noted above).

In the aforementioned embodiments, the mobile device 104 behavior with respect to reserved resources is dynamically indicated by control channel transmissions, either implicitly by the CORESET or explicitly in the DCI. Alternatively, in some embodiments, the mobile device 104 behavior can be semi-statically configured, e.g., via radio resource control (RRC) signaling.

In one embodiment of the invention, two different types of reserved resources are defined in the protocol specifications. If the first type is configured, the mobile device 104 expects no transmissions at all in reserved resources for the DL direction and does not transmit anything in the UL direction. If the second type is configured, the mobile device 104 expects at least some transmissions in reserved resources for the DL direction and transmits at least signals/channels in reserved resources for the UL direction. Accordingly, in previous embodiments, the dictation of mobile device 104 behavior was dynamic (at any time the base station device 102 can change and/or dictate the mobile device 104 behavior). In this embodiment, however the behavior is hardwired to mobile device 104 but configurable. Accordingly, the mobile device 104 behavior can be semi-static so it can be fixed but configurable. For example, at one time the base station device 102 can determine the reserved resource should be lower priority than an emergency call while at other times or if the mobile device 104 goes to a new location, the desired mobile device 104 behavior can change as dictated by the base station device 102. The base station device 102 can configure and re-configure the mobile device 104 from time to time. In another example, one of the two semi-static types/configurations can be dynamically selected by some embodiments herein.

Alternatively, in another embodiment of the invention, a single configuration for reserved resources can be defined in the protocol specifications and the configuration contains a field, for instance a single bit, which indicates whether the mobile device 104 shall expect/receive (or, in some embodiments, transmit) no signals/channels within the reserved resources for the DL (or, in some embodiments, UL) direction, or whether the UE shall expect/receive (or, in some embodiments, transmit) some signals/channels within the reserved resources for the DL (or, in some embodiments, UL) direction. For example, if there is an embodiment with mobile device 104 having configuration A, then the mobile device 104 can perform behavior A (unless it is overrode by the information sent by the base station device 102). As another example, if there is an embodiment with mobile device 104 having configuration B (which differs from configuration A), then the mobile device 104 can perform behavior B (unless it is overrode by the information sent by the base station device 102). In this embodiment, the designation of mobile device 104 behavior by the base station device 102 can be explicit.

In yet another embodiment of the invention, the mobile device 104 behavior in regard to reserved resources can be dynamically indicated by the DCI scheduling a PDSCH or PUSCH, however, the indication is not explicit, e.g., by a bit, but implicit from the scheduling grant/assignment. For example, if the PDSCH/PUSCH scheduled by a PDCCH is a slot based transmission, the mobile device 104 shall expect/receive (or, in some embodiments, transmit) no signals/channels within the reserved resources for the DL (or, in some embodiments, UL) direction. However, if the PDSCH/PUSCH scheduled by a PDCCH is a mini-slot based transmission, the mobile device 104 shall expect/receive (or, in some embodiments, transmit) some signals/channels within the reserved resources for the DL (or, in some embodiments, UL) direction. In other words, the duration of the scheduled transmission implicitly signals the mobile device 104 behavior in regard to reserved resources. Duration of transmission is one example and that it is not construed in a limiting sense, i.e., other properties of the scheduled transmission as indicated in the DCI can also implicitly indicate the mobile device 104 behavior in regard to reserved resources.

In LTE, transmissions are within a subframe so one transmission is one subframe. In some embodiments described herein, the subframe can be replaced with a different mode employing a slot (one mode is to transmit all for one slot). In another mode the transmission duration is dynamically indicated and is a mini-slot. A subframe is always 14 symbols but for a mini-slot there can be 1-13 symbols (e.g., use any number of symbols to dynamically indicate the transmission). Accordingly, if the mobile device 104 is scheduled with slot transmission, and the mobile device 104 behavior is dictated by configuration A for the mobile device 104 then if scheduled with mini-slot then the mobile device 104 will know to perform according to configured behavior B. Implicit signaling therefore is employed to dictate mobile device 104 behavior. As noted above, in other words, the duration of the scheduled transmission implicitly signals the mobile device 104 behavior in regard to reserved resources. Duration of transmission is one example and that it is not construed in a limiting sense, i.e., other properties of the scheduled transmission as indicated in the DCI can also implicitly indicate the mobile device 104 behavior in regard to reserved resources.

The reason it is beneficial to distinguish the mobile device 104 behavior for reserved resources is the following. Generally, the purpose of reserved resources is to not transmit anything on them, either at the base station device 102 in the downlink or at the mobile device 104 in the uplink. However, if a base station device 102 or the mobile device 104 was never allowed to transmit within a reserved resource, overall system operation would be severely limited. For example, a narrowband section of the available carrier bandwidth may be reserved in the frequency domain. If, however, a data packet arrives at the base station device 102 transmitter and the data packet as highly stringent latency and reliability requirements, then it should be possible to transmit that data packet at least partially on the reserved resources to guarantee the latency and/or reliability requirements associated with that packet. For example, the narrowband section may be reserved for massive machine-type communications (mMTC) and hence it is configured as reserved resources for mobile broadband mobile devices. If, however, a mobile broadband mobile device is scheduled with data that has low latency and high reliability constraints, those reserved resources can be used for such ultra-reliable low-latency communications (URLLC).

Similarly, when a mobile device initiates an emergency call (viz. dials 911), the network may configure a positioning reference signal (PRS) to determine the position of the mobile device 104. As explained above, under normal operation, the mobile device 104 would not expect any transmissions within the reserved resourced and similarly, would not transmit anything in reserved resources. However, in order to improve accuracy of the PRS, PRS may be transmitted in reserved resources.

In yet another embodiment of the invention, an ordered list of all signals and channels in the wireless communications system is specified. This list assigns for each channel/signal its priority with respect to other channels/signals. This list is then used to define for each channel/signal a priority with respect to reserved resources. For example, such an ordered list may comprise a total of N signals and channels. For entries 1 . . . k, the respective signal/channel shall be transmitted/received within a reserved resource whereas for entries k+1 . . . N, the respective signal/channel shall not be transmitted/received within a reserved resource.

If configurability of the mobile device is not desired and/or no other previously-mentioned embodiments are desired, the base station device 102 can generate information that defines a list of different channels and/or different signals. The list can indicate a ranking of one or more (or, in some embodiments, every) signal and/or data channels in order of importance. If a signal or data channel is provided in the list at a position above the position indicating the role of reserved resource then such higher-listed behavior can be performed even during the reserved resource time.

The memory 206 can be a computer-readable storage medium storing computer-executable instructions and/or information configured to perform one or more of the functions described herein with reference to the base station device 102. For example, in some embodiments, the memory 206 can store computer-readable storage media associated with determining information indicative of resource reservation for an individual mobile device 104 or a group of mobile devices, scheduling uplink and/or downlink communication for the mobile device 104 and the like. The processor 208 can perform one or more of the functions described herein with reference to the base station device 102.

The memory 312 can be a computer-readable storage medium storing computer-executable instructions and/or information configured to perform one or more of the functions described herein with reference to the mobile device 104. For example, in some embodiments, the memory 312 can store computer-readable storage media associated with determining information indicative of resource reservation for an individual mobile device 104 or a group of mobile devices, scheduling uplink and/or downlink communication for the mobile device 104, determining mobile device 104 behavior and the like. The processor 314 can perform one or more of the functions described herein with reference to the mobile device 104.

Figure 4:
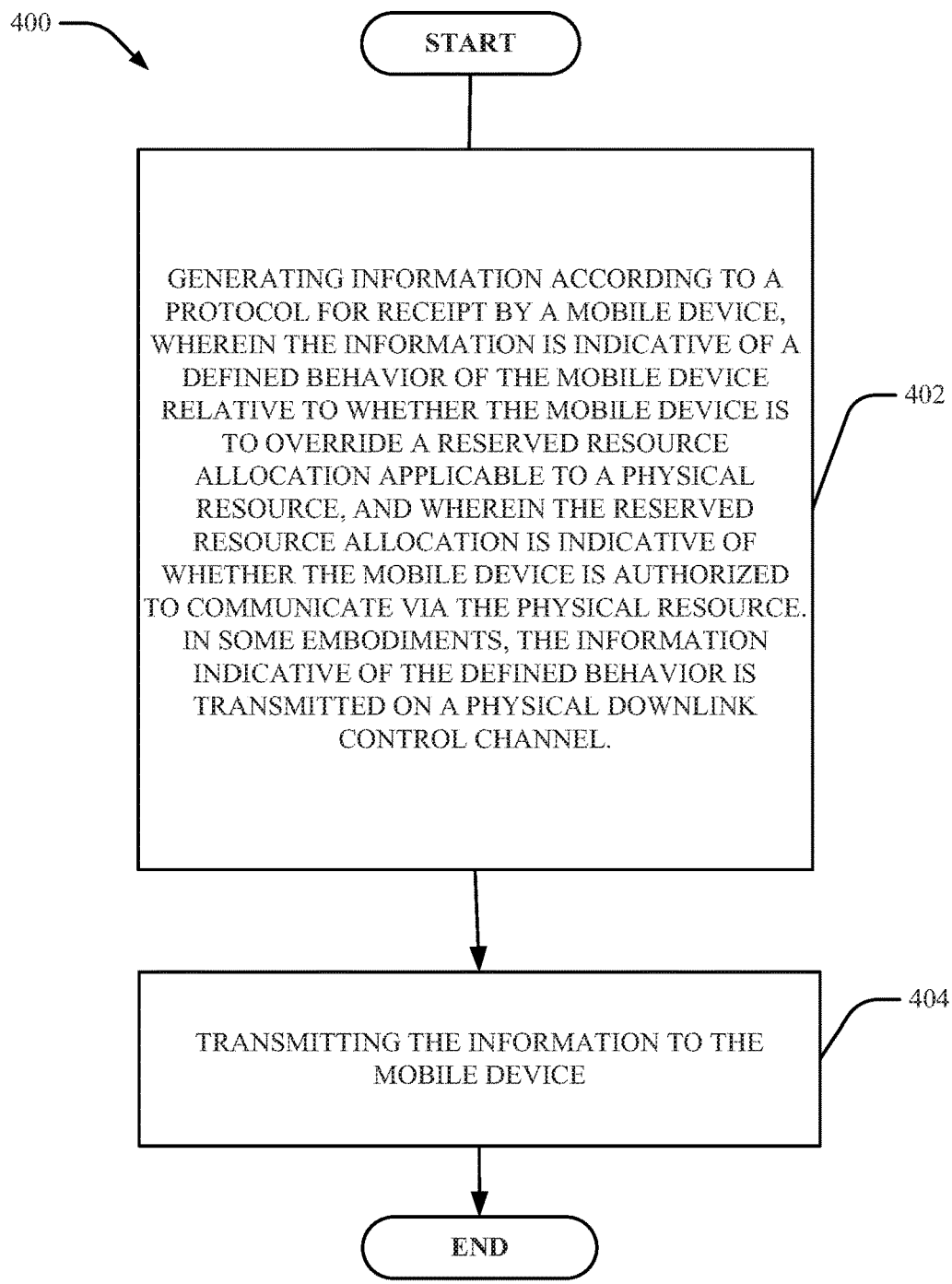
FIGS. 4, 5, 6, 7, 8, 9 and 10 illustrate flowcharts of methods that facilitate RE mapping for efficient use of the downlink shared channel in accordance with one or more embodiments described herein.

FIGS. 4, 5, 6, 7, 8 and 9 illustrate flowcharts of methods that facilitate RE mapping for efficient use of the downlink shared channel in accordance with one or more embodiments described herein. Turning first to FIG. 4, at 402, method 400 can comprise generating information according to a protocol for receipt by a mobile device, wherein the information is indicative of a defined behavior of the mobile device relative to whether the mobile device is to override a reserved resource allocation applicable to a physical resource, and wherein the reserved resource allocation is indicative of whether the mobile device is authorized to communicate via the physical resource. In some embodiments, the information indicative of the defined behavior is transmitted on a physical downlink control channel. At 404, method 400 can comprise transmitting the information to the mobile device.

Figure 5:
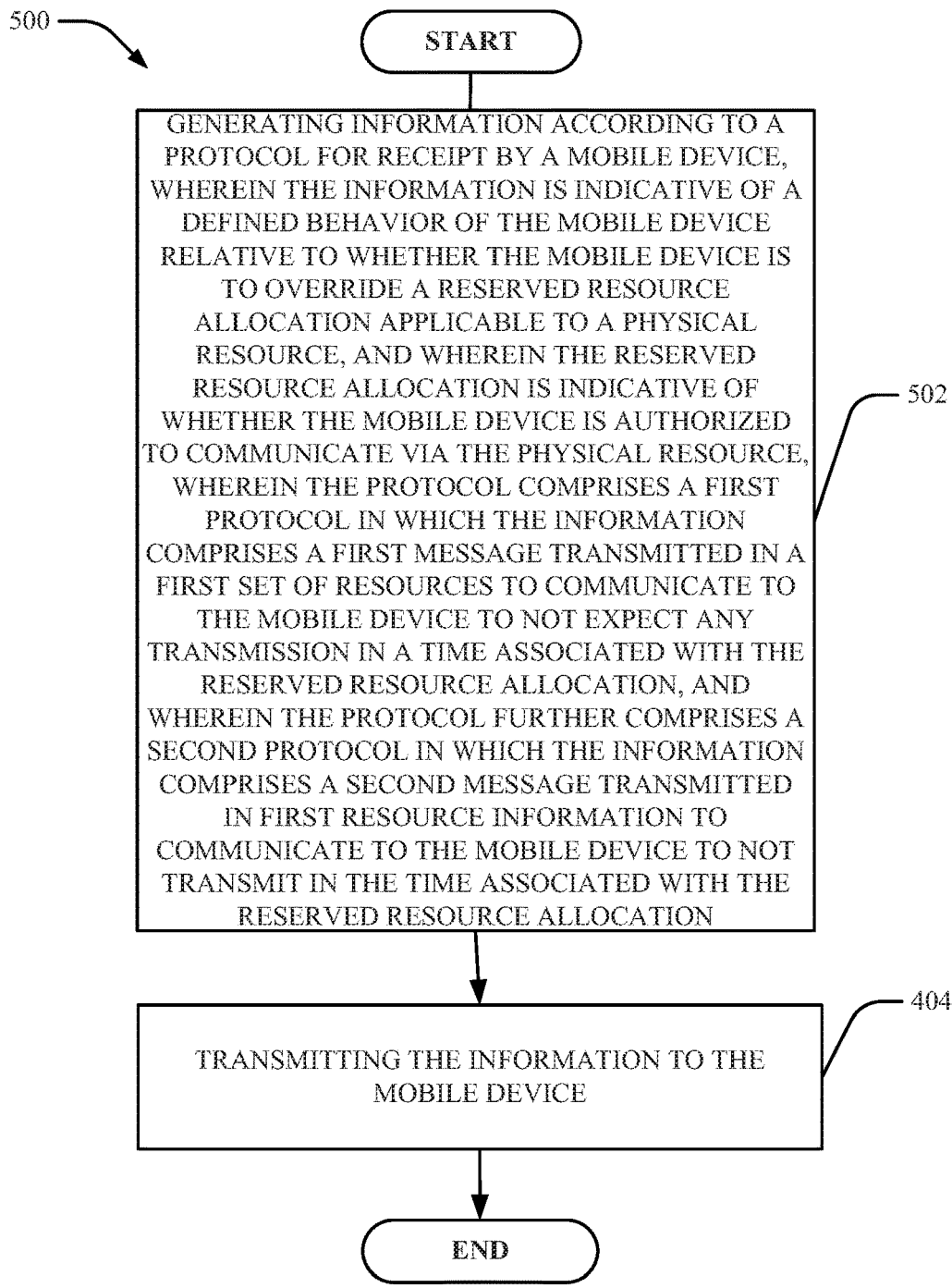

Turning now to FIG. 5, method 500 can comprise generating information according to a protocol for receipt by a mobile device, wherein the information is indicative of a defined behavior of the mobile device relative to whether the mobile device is to override a reserved resource allocation applicable to a physical resource, and wherein the reserved resource allocation is indicative of whether the mobile device is authorized to communicate via the physical resource, wherein the protocol comprises a first protocol in which the information comprises a first message transmitted in a first set of resources to communicate to the mobile device to not expect any transmission in a time associated with the reserved resource allocation, and wherein the protocol further comprises a second protocol in which the information comprises a second message transmitted in first resource information to communicate to the mobile device to not transmit in the time associated with the reserved resource allocation.

In some embodiments, the mobile device is part of a group of mobile devices and downlink control information is sent to the group of mobile devices. In some embodiments, the downlink control information communicates to the mobile device a transmission duration of a channel and where whether to expect transmission or reception in the reserved resource allocation is communicated to the mobile device by the transmission duration. The next step of method 500 can comprise 404 of method 400.

Figure 6:
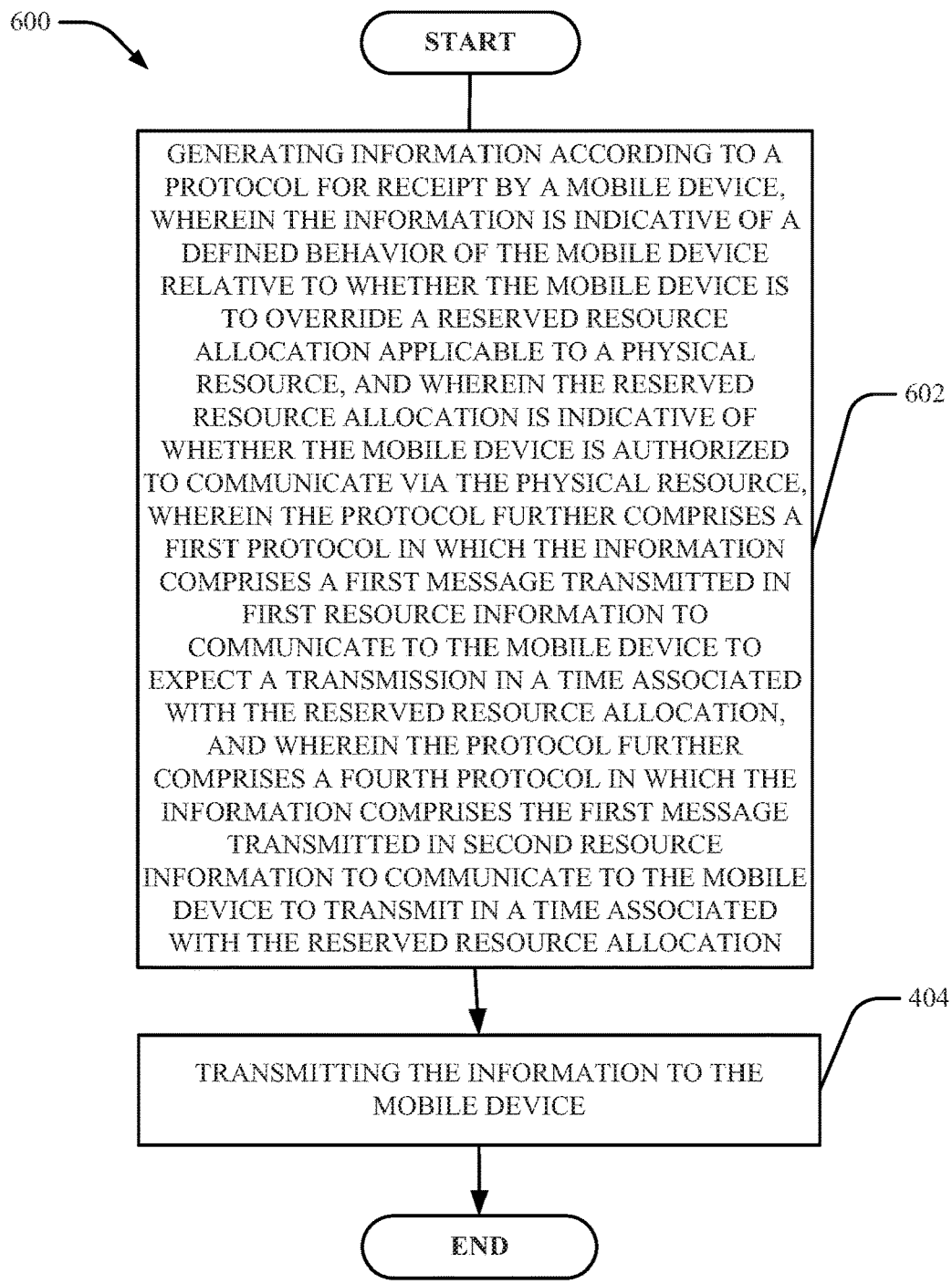

Turning now to FIG. 6, method 600 can comprise generating information according to a protocol for receipt by a mobile device, wherein the information is indicative of a defined behavior of the mobile device relative to whether the mobile device is to override a reserved resource allocation applicable to a physical resource, and wherein the reserved resource allocation is indicative of whether the mobile device is authorized to communicate via the physical resource, wherein the protocol further comprises a first protocol in which the information comprises a first message transmitted in first resource information to communicate to the mobile device to expect a transmission in a time associated with the reserved resource allocation, and wherein the protocol further comprises a fourth protocol in which the information comprises the first message transmitted in second resource information to communicate to the mobile device to transmit in a time associated with the reserved resource allocation. In some embodiments, the mobile device is part of a group of mobile devices and downlink control information is sent to the group of mobile devices. The next step of method 600 can comprise 404 of method 400.

Figure 7:
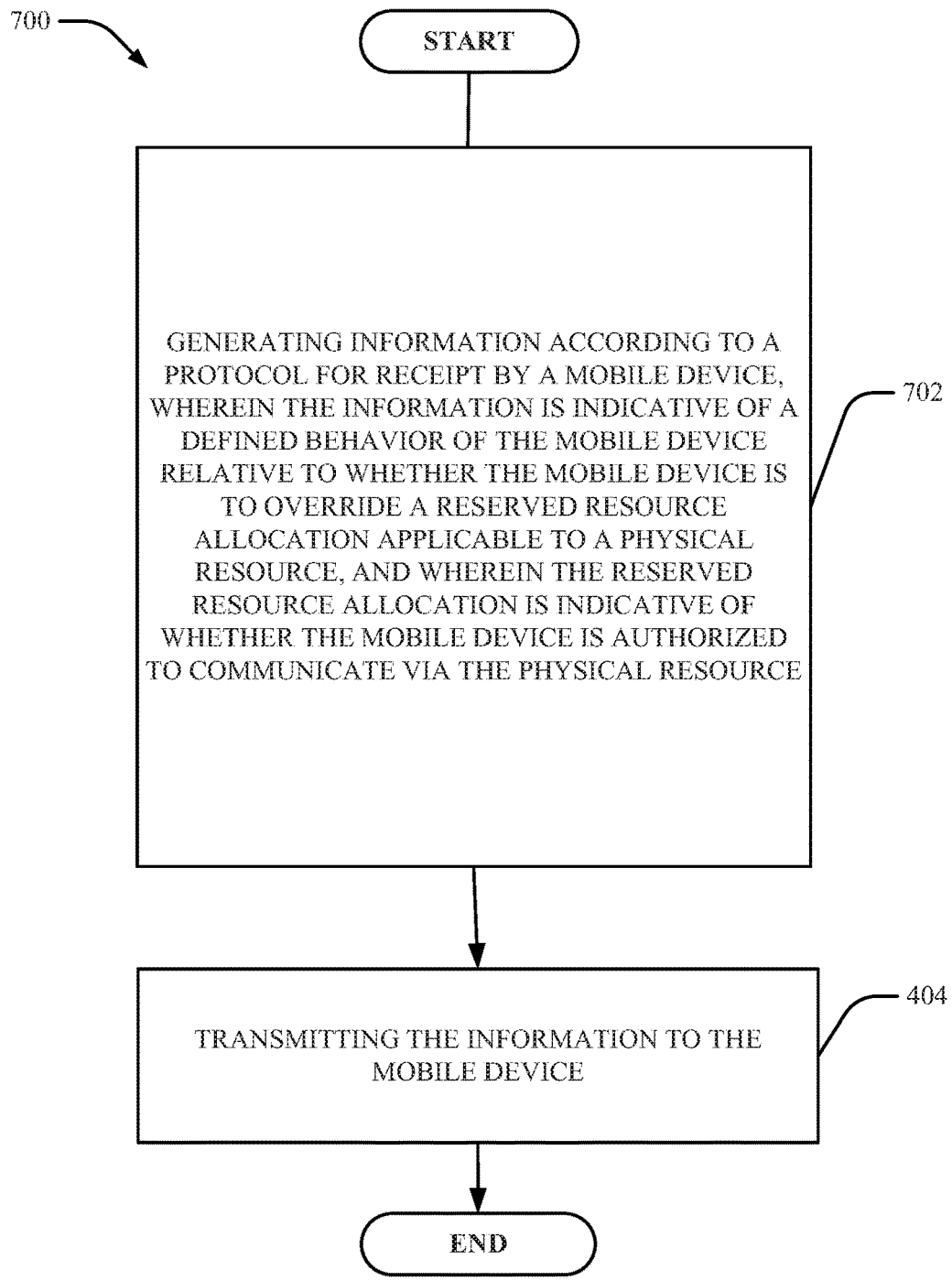

Turning now to FIG. 7, at 702, method 700 can comprise generating information according to a protocol for receipt by a mobile device, wherein the information is indicative of a defined behavior of the mobile device relative to whether the mobile device is to override a reserved resource allocation applicable to a physical resource, and wherein the reserved resource allocation is indicative of whether the mobile device is authorized to communicate via the physical resource. In some embodiments, the information indicative of the defined behavior is transmitted on a physical downlink control channel, wherein the protocol comprises a communication protocol in which the information indicative of the defined behavior comprises a defined single bit value of a group of values in downlink control information that communicate, to the mobile device, whether to expect transmission or reception in a time associated with the reserved resource allocation. The next step of method 700 can comprise 404 of method 400.

Figure 8:
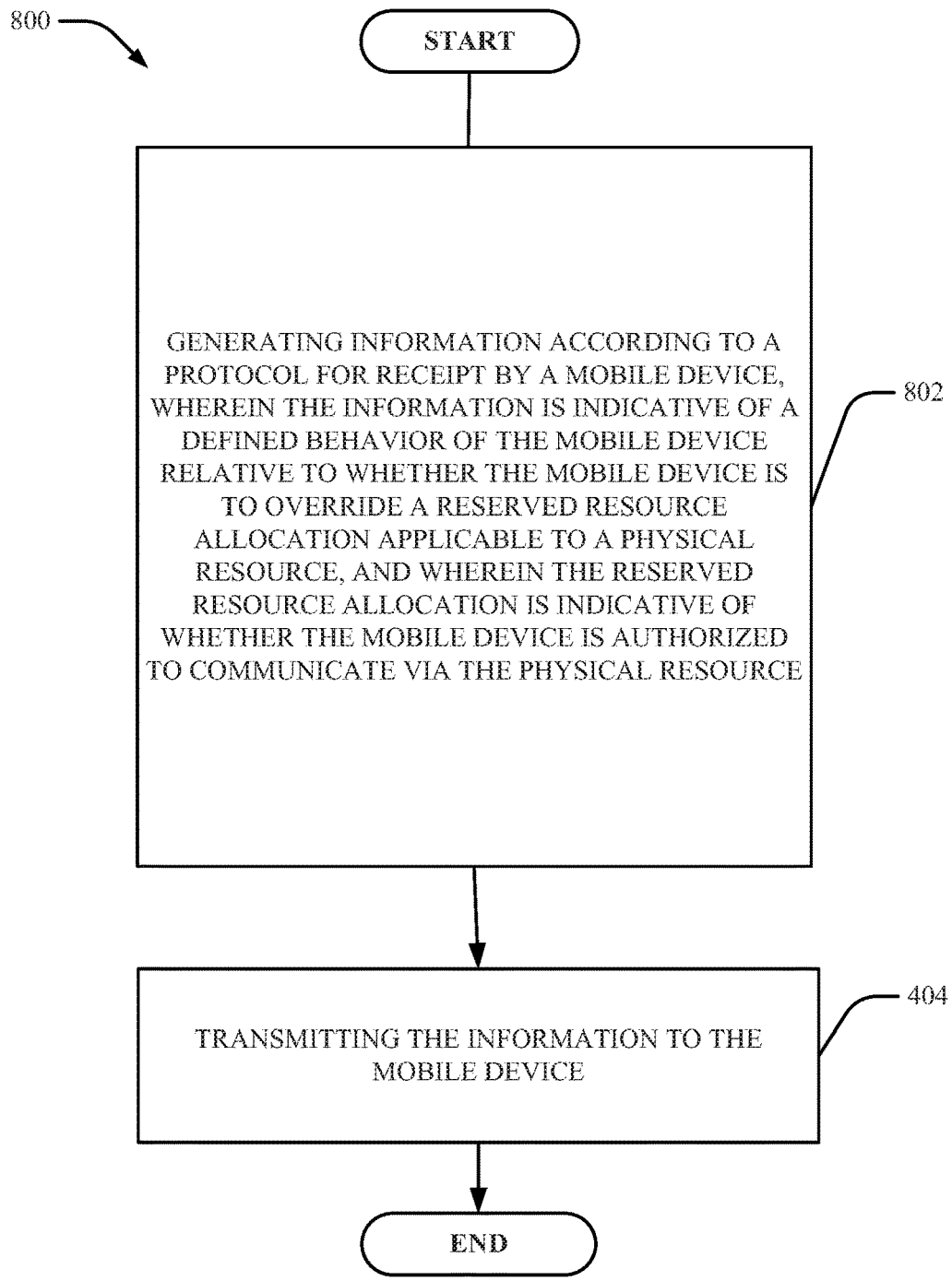

Turning now to FIG. 8, at 802, method 800 can comprise generating information according to a protocol for receipt by a mobile device, wherein the information is indicative of a defined behavior of the mobile device relative to whether the mobile device is to override a reserved resource allocation applicable to a physical resource, and wherein the reserved resource allocation is indicative of whether the mobile device is authorized to communicate via the physical resource. In some embodiments, the information indicative of the defined behavior is transmitted on a physical downlink control channel, wherein the protocol and the group of values further comprises information indicative of a downlink assignment for a physical downlink shared channel or information indicative of an uplink grant for a physical uplink shared channel. The next step of method 800 can comprise 404 of method 400.

Figure 9:
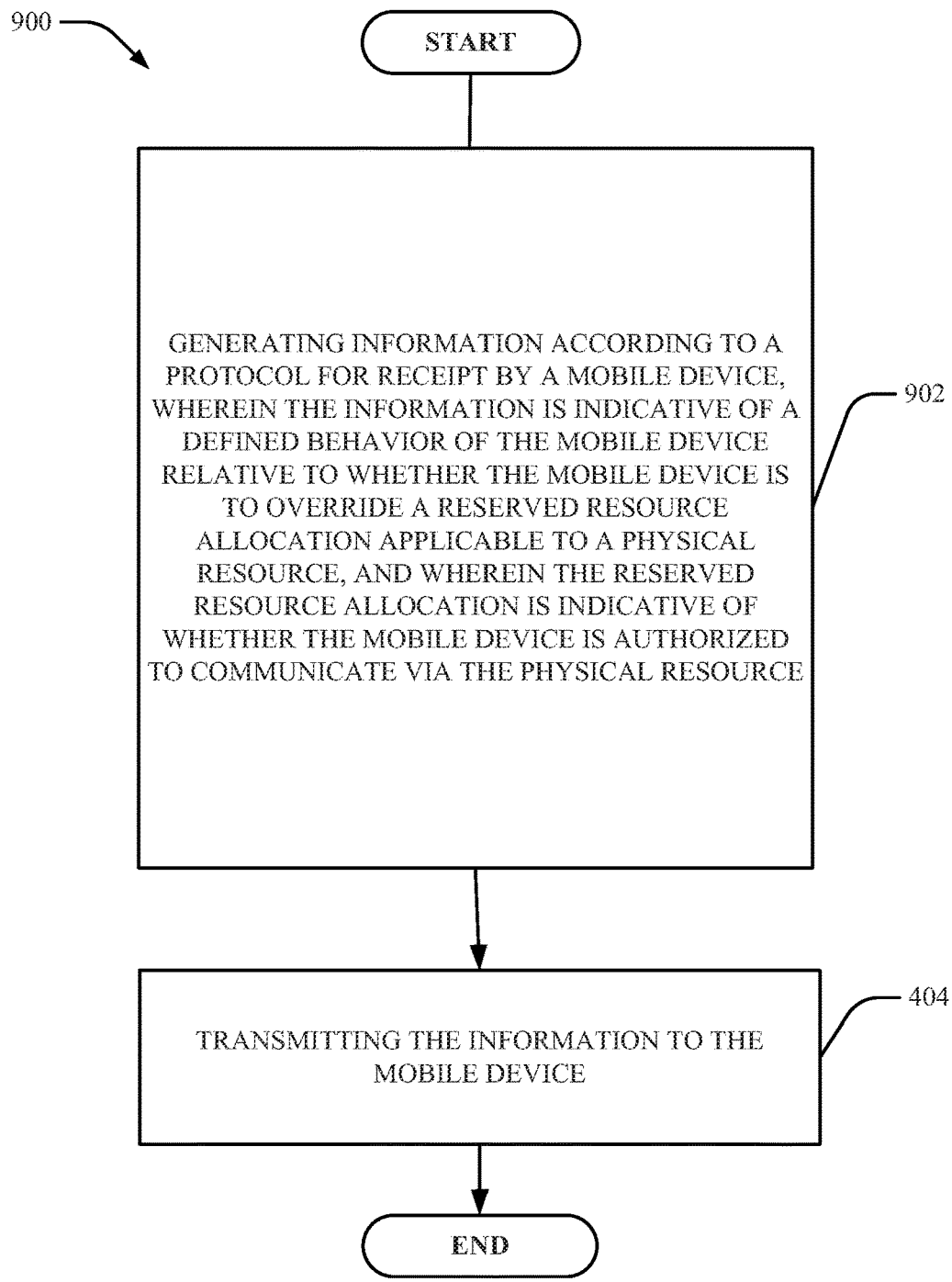

Turning now to FIG. 9, at 902, method 900 can comprise generating information according to a protocol for receipt by a mobile device, wherein the information is indicative of a defined behavior of the mobile device relative to whether the mobile device is to override a reserved resource allocation applicable to a physical resource, and wherein the reserved resource allocation is indicative of whether the mobile device is authorized to communicate via the physical resource. In some embodiments, the information indicative of the defined behavior is transmitted on a physical downlink control channel, wherein the information communicates to the mobile device whether to expect transmission or reception in the reserved resource allocation based on a semi-static configuration for the mobile device, wherein the semi-static configuration comprises a defined value. In some embodiments, the defined value further indicates whether the mobile device is to expect transmission of a signal or data in the reserved resource allocation. The next step of method 900 can comprise 404 of method 400.

In some other embodiments, the information communicates to the mobile device whether to expect transmission or reception in a time associated with the reserved resource allocation based on a format of the downlink control information.

Figure 10:
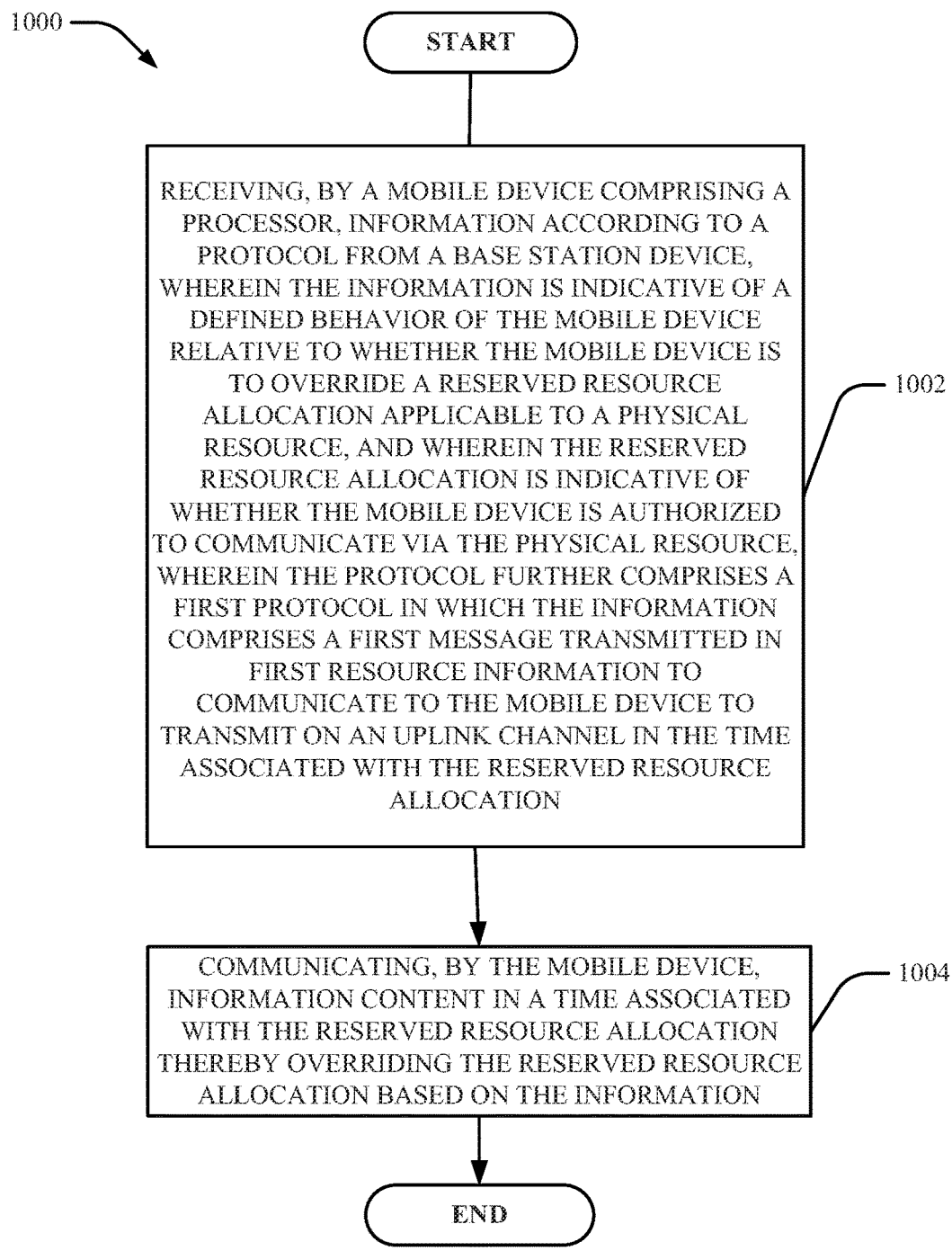

Turning now to FIG. 10, at 1002, method 1000 can comprise receiving (by a mobile device) information according to a protocol from a base station device, wherein the information is indicative of a defined behavior of the mobile device relative to whether the mobile device is to override a reserved resource allocation applicable to a physical resource, and wherein the reserved resource allocation is indicative of whether the mobile device is authorized to communicate via the physical resource, wherein the protocol further comprises a first protocol in which the information comprises a first message transmitted in first resource information to communicate to the mobile device to transmit on an uplink channel in the time associated with the reserved resource allocation.

At 1004, method 1000 can comprise communicating information content in a time associated with the reserved resource allocation thereby overriding the reserved resource allocation based on the information. The mobile device can control the rate matching and/or puncturing behavior of the transmitter and receiver of the mobile device based on the reserved resources.

In some embodiments, the protocol further comprises a first protocol in which the information comprises a first message transmitted in first resource information to communicate to the mobile device to transmit on an uplink channel in the time associated with the reserved resource allocation.

In some embodiments, the protocol further comprises a first protocol in which the information in addition to a configuration of the mobile device are employed by the mobile device to determine to perform transmitting during the time associated with the reserved resource allocation.

Figure 11:
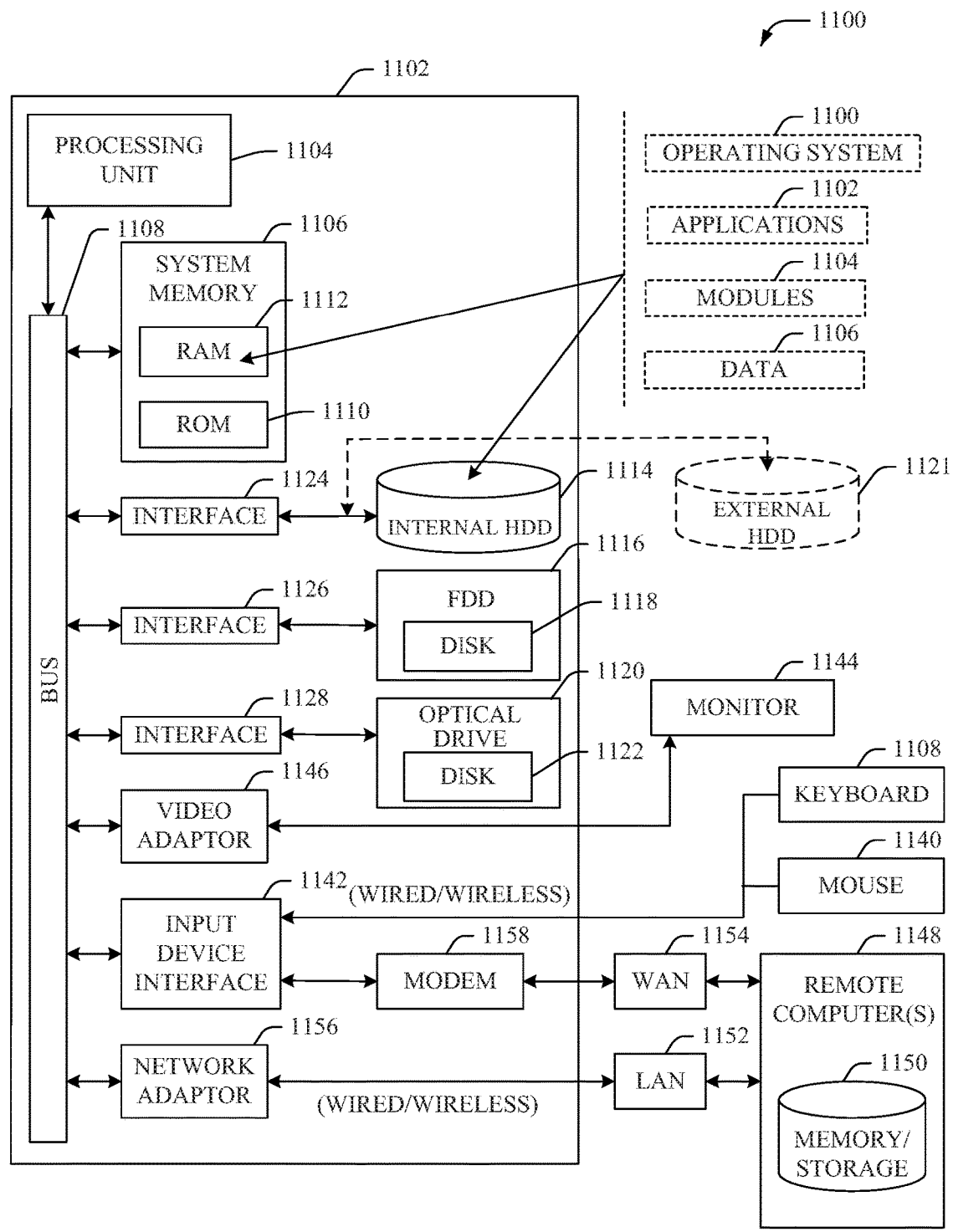
FIG. 11 illustrates a block diagram of a computer that can be employed in accordance with one or more embodiments described herein.

FIG. 11 illustrates a block diagram of a computer that can be employed in accordance with one or more embodiments. Repetitive description of like elements employed in other embodiments described herein is omitted for sake of brevity.

In some embodiments, the computer, or a component of the computer, can be or be comprised within any number of components described herein comprising, but not limited to, base station device 102 or mobile device 104 (or a component of base station device 102 or mobile device 104). In order to provide additional text for various embodiments described herein, FIG. 11 and the following discussion are intended to provide a brief, general description of a suitable computing environment 1100 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules comprise routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable (or machine-readable) storage media and/or communications media, which two terms are used herein differently from one another as follows. Computer-readable (or machine-readable) storage media can be any available storage media that can be accessed by the computer (or a machine, device or apparatus) and comprises both volatile and nonvolatile media, removable and non-removable media. By way of example, and not limitation, computer-readable (or machine-readable) storage media can be implemented in connection with any method or technology for storage of information such as computer-readable (or machine-readable) instructions, program modules, structured data or unstructured data. Tangible and/or non-transitory computer-readable (or machine-readable) storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage, other magnetic storage devices and/or other media that can be used to store desired information. Computer-readable (or machine-readable) storage media can be accessed by one or more local or remote computing devices, e.g., via access requests, queries or other data retrieval protocols, for a variety of operations with respect to the information stored by the medium.

In this regard, the term "tangible" herein as applied to storage, memory or computer-readable (or machine-readable) media, is to be understood to exclude only propagating intangible signals per se as a modifier and does not relinquish coverage of all standard storage, memory or computer-readable (or machine-readable) media that are not only propagating intangible signals per se.

In this regard, the term "non-transitory" herein as applied to storage, memory or computer-readable (or machine-readable) media, is to be understood to exclude only propagating transitory signals per se as a modifier and does not relinquish coverage of all standard storage, memory or computer-readable (or machine-readable) media that are not only propagating transitory signals per se.

Communications media typically embody computer-readable (or machine-readable) instructions, data structures, program modules or other structured or unstructured data in a data signal such as a modulated data signal, e.g., a channel wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 11, the example environment 1100 for implementing various embodiments of the embodiments described herein comprises a computer 1102, the computer 1102 comprising a processing unit 1104, a system memory 1106 and a system bus 1108. The system bus 1108 couples system components comprising, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 comprises ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also comprise a high-speed RAM such as static RAM for caching data.

The computer 1102 further comprises an internal hard disk drive (HDD) 1110 (e.g., EIDE, SATA), which internal hard disk drive 1114 can also be configured for external use in a suitable chassis (not shown), a magnetic floppy disk drive 1116, (e.g., to read from or write to a removable diskette 1118) and an optical disk drive 1120, (e.g., reading a CD-ROM disk 1122 or, to read from or write to other high capacity optical media such as the DVD). The hard disk drive 1114, magnetic disk drive 1116 and optical disk drive 1120 can be connected to the system bus 1108 by a hard disk drive interface 1124, a magnetic disk drive interface 1126 and an optical drive interface, respectively. The interface 1124 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable (or machine-readable) storage media provide nonvolatile storage of data, data structures, computer-executable instructions, and so forth. For the computer 1102, the drives and storage media accommodate the storage of any data in a suitable digital format. Although the description of computer-readable (or machine-readable) storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 1112, comprising an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

A communication device can enter commands and information into the computer 1102 through one or more wired/wireless input devices, e.g., a keyboard 1138 and a pointing device, such as a mouse 1140. Other input devices (not shown) can comprise a microphone, an infrared (IR) remote control, a joystick, a game pad, a stylus pen, touch screen or the like. These and other input devices are often connected to the processing unit 1104 through an input device interface 1142 that can be coupled to the system bus 1108, but can be connected by other interfaces, such as a parallel port, an IEEE 1394 serial port, a game port, a universal serial bus (USB) port, an IR interface, etc.

A monitor 1144 or other type of display device can be also connected to the system bus 1108 via an interface, such as a video adapter 1146. In addition to the monitor 1144, a computer typically comprises other peripheral output devices (not shown), such as speakers, printers, etc.

The computer 1102 can operate in a networked environment using logical connections via wired and/or wireless communications to one or more remote computers, such as a remote computer(s) 1148. The remote computer(s) 1148 can be a workstation, a server computer, a router, a personal computer, portable computer, microprocessor-based entertainment appliance, a peer device or other common network node, and typically comprises many or all of the elements described relative to the computer 1102, although, for purposes of brevity, only a memory/storage device 1150 is illustrated. The logical connections depicted comprise wired/wireless connectivity to a local area network (LAN) 1152 and/or larger networks, e.g., a wide area network (WAN) 1154. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1152 through a wired and/or wireless communication network interface or adapter 1156. The adapter 1156 can facilitate wired or wireless communication to the LAN 1152, which can also comprise a wireless AP disposed thereon for communicating with the wireless adapter 1156.

When used in a WAN networking environment, the computer 1102 can comprise a modem 1158 or can be connected to a communications server on the WAN 1154 or has other means for establishing communications over the WAN 1154, such as by way of the Internet. The modem 1158, which can be internal or external and a wired or wireless device, can be connected to the system bus 1108 via the input device interface 1142. In a networked environment, program modules depicted relative to the computer 1102 or portions thereof, can be stored in the remote memory/storage device 1150. It will be appreciated that the network connections shown are example and other means of establishing a communications link between the computers can be used.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a defined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a femto cell device. Wi-Fi networks use radio technologies called IEEE 802.11 (a, b, g, n, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands, at an 11 Mbps (802.11a) or 54 Mbps (802.11b) data rate, for example or with products that contain both bands (dual band), so the networks can provide real-world performance similar to the basic 10 Base T wired Ethernet networks used in many offices.

The embodiments described herein can employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of an acquired network. A classifier is a function that maps an input attribute vector, $x=(x1, x2, x3, x4, \ldots, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a communication device desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing communication device behavior, operator preferences, historical information, receiving extrinsic information). For example, SVMs can be configured via a learning or training phase within a classifier constructor and feature selection module. Thus, the classifier(s) can be used to automatically learn and perform a number of functions, comprising but not limited to determining according to a predetermined criteria which of the acquired cell sites will benefit a maximum number of subscribers and/or which of the acquired cell sites will add minimum value to the existing communication network coverage, etc.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of communication device equipment. A processor can also be implemented as a combination of computing processing units.

As used herein, terms such as "data storage," "database," and substantially any other information storage component relevant to operation and functionality of a component, refer to "memory components," or entities embodied in a "memory" or components comprising the memory. It will be appreciated that the memory components or computer-readable (or machine-readable) storage media, described herein can be either volatile memory or nonvolatile memory or can comprise both volatile and nonvolatile memory.

Memory disclosed herein can comprise volatile memory or nonvolatile memory or can comprise both volatile and nonvolatile memory. By way of illustration, and not limitation, nonvolatile memory can comprise read only memory (ROM), programmable ROM (PROM), electrically programmable ROM (EPROM), electrically erasable PROM (EEPROM) or flash memory. Volatile memory can comprise random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory (e.g., data storages, databases) of the embodiments are intended to comprise, without being limited to, these and any other suitable types of memory.

What has been described above comprises mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "comprises" is used in either the detailed description or the claims, such term is intended to be inclusive in a manner similar to the term "comprising" as "comprising" is interpreted when employed as a transitional word in a claim.

What is claimed is:

1. An apparatus, comprising:
    a processor; and
    a memory that stores executable instructions that, when executed by the processor, facilitate performance of operations, comprising:
        generating information according to a protocol for receipt by a mobile device, wherein the information indicates whether a defined behavior of the mobile device is to occur, wherein the defined behavior is the mobile device overriding a reserved resource allocation applicable to a physical resource, wherein the reserved resource allocation indicates whether the mobile device is authorized to communicate via the physical resource, wherein the protocol comprises a first protocol in which the information comprises a first message transmitted in a group of resources to communicate to the mobile device not to expect any transmission in a time associated with the reserved resource allocation, and wherein the protocol further comprises a second protocol in which the information comprises a second message transmitted in first resource information to communicate to the mobile device not to transmit in the time associated with the reserved resource allocation; and
        transmitting the information to the mobile device.

2. The apparatus of claim 1, wherein the information indicative of the defined behavior is transmitted on a control channel.

3. The apparatus of claim 1, wherein the protocol further comprises a third protocol in which the information indicative of the defined behavior comprises a defined single bit value of a group of values in downlink control information.

4. The apparatus of claim 1, wherein the mobile device is part of a group of mobile devices and downlink control information is sent to the group of mobile devices.

5. The apparatus of claim 3, wherein the protocol and the group of values are indicative of a downlink assignment for a physical downlink shared channel.

6. The apparatus of claim 1, wherein the information according to the protocol communicates to the mobile device based on a semi-static configuration for the mobile device, and wherein the semi-static configuration comprises a defined value.

7. The apparatus of claim 3, wherein the downlink control information communicates, to the mobile device, a transmission duration of a channel.

8. The apparatus of claim 3, wherein the information is based on a format of the downlink control information.

9. The apparatus of claim 1, wherein the mobile device performs a first operation different than a second operation previously dictated by the apparatus based on the overriding the reserved resource allocation results.

10. The apparatus of claim 2, wherein the control channel comprises a physical downlink control channel.

11. The apparatus of claim 3, wherein the protocol and the group of values are indicative of an uplink grant for a physical uplink shared channel.

12. A method, comprising:
    generating, by a device comprising a processor, information according to a protocol, and for receipt by a mobile device, wherein the information indicates the mobile device is to override a reserved resource allocation applicable to a physical resource,
        wherein the protocol further comprises a first protocol in which the information comprises a message transmitted in first resource information to communicate to the mobile device to expect to receive a transmission in a time period associated with the reserved resource allocation, and
        wherein the protocol further comprises a second protocol in which the information comprises the first message transmitted in second resource information to communicate to the mobile device to transmit in the time period associated with the reserved resource allocation; and
    transmitting, by the device, the information to the mobile device.

13. The method of claim 12, wherein the protocol comprises a third protocol in which the information indicative of the defined behavior comprises a defined single bit value of a group of values in downlink control information.

14. The method of claim 12, wherein the information communicates to the mobile device based on a semi-static configuration for the mobile device, and wherein the semi-static configuration comprises a defined value.

15. The method of claim 12, wherein the defined value further indicates whether the mobile device is to expect transmission of a signal during the time period associated with the reserved resource allocation.

16. The method of claim 13, wherein the protocol and the group of values are indicative of an uplink grant for a physical uplink shared channel.

17. The method of claim 12, wherein the mobile device performs a first operation different than a second operation previously dictated by the device based on the overriding the reserved resource allocation results.

18. A machine-readable storage medium, comprising executable instructions that, when executed by a processor of a mobile device, facilitate performance of operations, comprising:
    receiving information according to a protocol, from a base station device, that indicates the mobile device is to override a reserved resource allocation applicable to a physical resource
        wherein the protocol further comprises a first protocol in which the information comprises a message transmitted in first resource information to communicate to the mobile device to expect to receive a transmission in a time period associated with the reserved resource allocation, and
        wherein the protocol further comprises a second protocol in which the information comprises the message transmitted in second resource information to communicate to the mobile device to transmit in the time period associated with the reserved resource allocation; and overriding the reserved resource allocation based on the receiving the information.

19. The machine-readable storage medium of claim 18, wherein the information is further employed to communicate to the mobile device to transmit on an uplink channel in the time period associated with the reserved resource allocation.

20. The machine-readable storage medium of claim 18, wherein the information is employed by the mobile device to determine to perform transmitting during the time period associated with the reserved resource allocation.

* * * * *